(12) United States Patent
Allmon et al.

(10) Patent No.: US 6,491,497 B1
(45) Date of Patent: Dec. 10, 2002

(54) METHOD AND APPARATUS FOR SUPPORTING ROTOR ASSEMBLIES DURING UNBALANCES

(75) Inventors: Barry Lynn Allmon, Maineville, OH (US); Christopher Charles Glynn, Hamilton, OH (US); Kenneth Lee Fisher, Lockland, OH (US); Daniel Edward Mollmann, Cincinnati, OH (US); Bala Corattiyil, Cincinnati, OH (US); Randy Marinus Vondrell, Sharonville, OH (US); Morris Green Penn, West Chester, OH (US); Michael Joseph Gambone, Mason, OH (US); Jan Christopher Schilling, Middletown, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/668,908

(22) Filed: Sep. 22, 2000

(51) Int. Cl.$^7$ .......................... F01D 25/16; F16C 41/00
(52) U.S. Cl. ....................... 416/174; 416/500; 384/624; 384/495; 384/558
(58) Field of Search ..................... 416/2, 174, 500; 415/9, 170.1, 174.4; 384/624, 495, 498, 558

(56) References Cited

U.S. PATENT DOCUMENTS

| | | | | |
|---|---|---|---|---|
| 1,009,586 A | * | 11/1911 | Schmidt | 384/495 X |
| 1,094,312 A | * | 4/1914 | Delmez | 384/498 |
| 1,492,672 A | * | 5/1924 | Brunner | 384/498 |
| 2,397,164 A | * | 3/1946 | Shafer | 384/495 |
| 2,656,227 A | * | 10/1953 | Comery | 384/498 |
| 2,676,853 A | * | 4/1954 | Shafer | 384/495 X |
| 2,975,007 A | * | 3/1961 | Zwicker | 384/498 |
| 3,224,821 A | * | 12/1965 | Barr | 384/498 X |
| 4,375,906 A | * | 3/1983 | Roberts et al. | 384/490 |
| 4,981,415 A | * | 1/1991 | Marmol et al. | 415/174.2 |
| 5,433,584 A | * | 7/1995 | Amin et al. | 415/229 |
| 6,082,959 A | * | 7/2000 | Van Duyn | 415/174.4 X |
| 6,152,604 A | * | 11/2000 | Ostling et al. | 384/495 X |
| 6,312,215 B1 | * | 11/2001 | Walker | 415/9 |
| 6,331,078 B1 | * | 12/2001 | Van Duyn | 384/498 |

* cited by examiner

Primary Examiner—John E. Ryznic
(74) Attorney, Agent, or Firm—Nathan D. Herkamp; Armstrong Teasdale LLP

(57) ABSTRACT

A rotor assembly for a gas turbine engine includes a bearing assembly that reduces dynamic loads to a support frame and static bending to the rotor assembly during periods of rotor unbalance. The rotor assembly includes a rotor shaft coupled to a fan and supported longitudinally with a plurality of bearing assemblies on a support frame. A number two bearing assembly includes a paired race, a rolling element, and a mounting race. The mounting race includes a spherical face and is secured to the bearing assembly with a retainer that plastically fails at a pre-determined moment load.

19 Claims, 5 Drawing Sheets

METHOD AND APPARATUS FOR SUPPORTING ROTOR ASSEMBLIES DURING UNBALANCES

BACKGROUND OF THE INVENTION

This application relates generally to gas turbine engine rotor assemblies and, more particularly, to bearing assemblies for gas turbine engine rotor assemblies.

Gas turbine engines typically include a rotor assembly, a compressor, and a turbine. The rotor assembly includes a fan that includes an array of fan blades extending radially outward from a rotor shaft. The rotor shaft transfers power and rotary motion from the turbine to the compressor and the fan and is supported longitudinally with a plurality of bearing assemblies. Additionally, the rotor assembly has an axis of rotation that passes through a rotor assembly center of gravity. Known bearing assemblies include rolling elements and a paired race, wherein the rolling elements are supported within the paired race. To maintain rotor critical speed margin, the rotor assembly is supported on three bearing assemblies, one of which is a thrust bearing assembly and two which are roller bearing assemblies. The thrust bearing assembly supports the rotor shaft and minimizes axial and radial movement of the rotor shaft assembly. The remaining roller bearing assemblies support radial movement of the rotor shaft.

During operation of the engine, a fragment of a fan blade may become separated from the remainder of the blade. Accordingly, a substantial rotary unbalance load may be created within the damaged fan and carried substantially by the fan shaft bearings, the fan bearing supports, and the fan support frames.

To minimize the effects of potentially damaging abnormal imbalance loads, known engines include support components for the fan rotor support system that are sized to provide additional strength for the fan support system. However, increasing the strength of the support components undesirably increases an overall weight of the engine and decreases an overall efficiency of the engine when the engine is operated without substantial rotor imbalances.

Other known engines include a bearing support that includes a mechanically weakened section, or primary fuse, that decouples the fan rotor from the fan support system. During such events, the fan shaft seeks a new center of rotation that approximates that of its unbalanced center for gravity. This fuse section, in combination with a rotor clearance allowance, is referred to as a load reduction device, or LRD. The LRD reduces the rotating dynamic loads to the fan support system.

After the primary fuse fails, the pitching fan rotor often induces a large moment to a next closest bearing. The next closest bearing is known as the number two bearing position. The moment induced to the number two bearing induces high bending and stress loads to the fan rotor locally. To relieve the high bending stresses, the radial and pitching rotation stiffness of the number two bearing position are often softened or released. However, in order to maintain a safe shutdown and subsequent windmill of the engine during the time it takes to land an aircraft, the remaining bearing assemblies must remain functional and maintain radial stiffness to provide fan critical speed margin above a fly home windmilling speed.

BRIEF SUMMARY OF THE INVENTION

In an exemplary embodiment, a rotor assembly for a gas turbine engine includes a rotor assembly and support system that reduce dynamic loads to the overall engine structure. The rotor assembly and support system include a rotor shaft coupled to a fan and supported longitudinally with a plurality of bearing assemblies and supports. Specifically, a first bearing housing includes a primary fuse that fails when exposed to a pre-determined load as a result of a fan imbalance. A second bearing assembly aft of the first bearing assembly and serially downstream from the first bearing assembly further reduces dynamic loading to the support frame and thus, facilitates reducing static shaft bending stresses induced locally to the bearing.

The second bearing assembly includes a paired race, a rolling element, and a mounting race. The paired race includes an inner race and an outer race, each sized to receive the rolling element therein. The mounting race includes a spherical face and is secured to the bearing assembly with retainers. The retainers fail when exposed to a pre-determined moment load, but withstand normal engine operating loads. These retainers are hereinafter referred to as secondary fuses.

During operation, after the primary fuse fails and a moment load above a pre-determined level is transmitted to the second bearing assembly, the second bearing assembly retainer fails. After the secondary fuse failure, the moment stiffness of the number two bearing is released, allowing further pitch rotation of the fan shaft on the spherical face. As a result, the bearing assembly facilitates reducing static bending loads to the rotor and dynamic loads transmitted to the support frame structure. Radial support of the bearing position is then maintained providing critical speed margin over fan windmilling speeds.

DETAILED DESCRIPTION OF THE INVENTION

Figure 1:
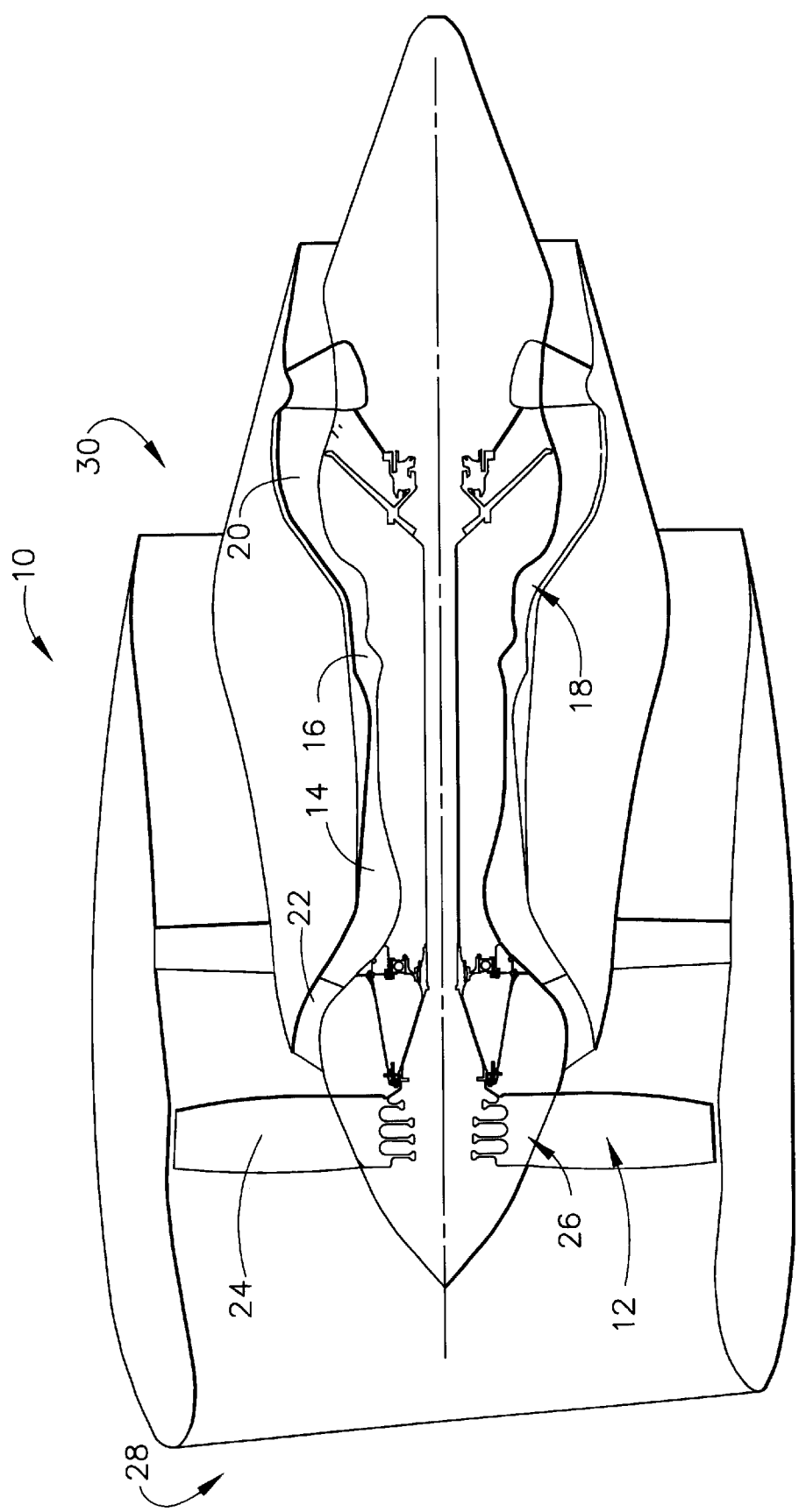
FIG. 1 is schematic illustration of a gas turbine engine.

FIG. 1 is a schematic illustration of a gas turbine engine 10 including a fan assembly 12, a high pressure compressor 14, and a combustor 16. Engine 10 also includes a high pressure turbine 18, a low pressure turbine 20, and a booster 22. Fan assembly 12 includes an array of fan blades 24 extending radially outward from a rotor disc 26. Engine 10 has an intake side 28 and an exhaust side 30.

In operation, air flows through fan assembly 12 and compressed air is supplied to high pressure compressor 14. The highly compressed air is delivered to combustor 16. Airflow (not shown in FIG. 1) from combustor 16 drives turbines 18 and 20, and turbine 20 drives fan assembly 12.

Figure 2:
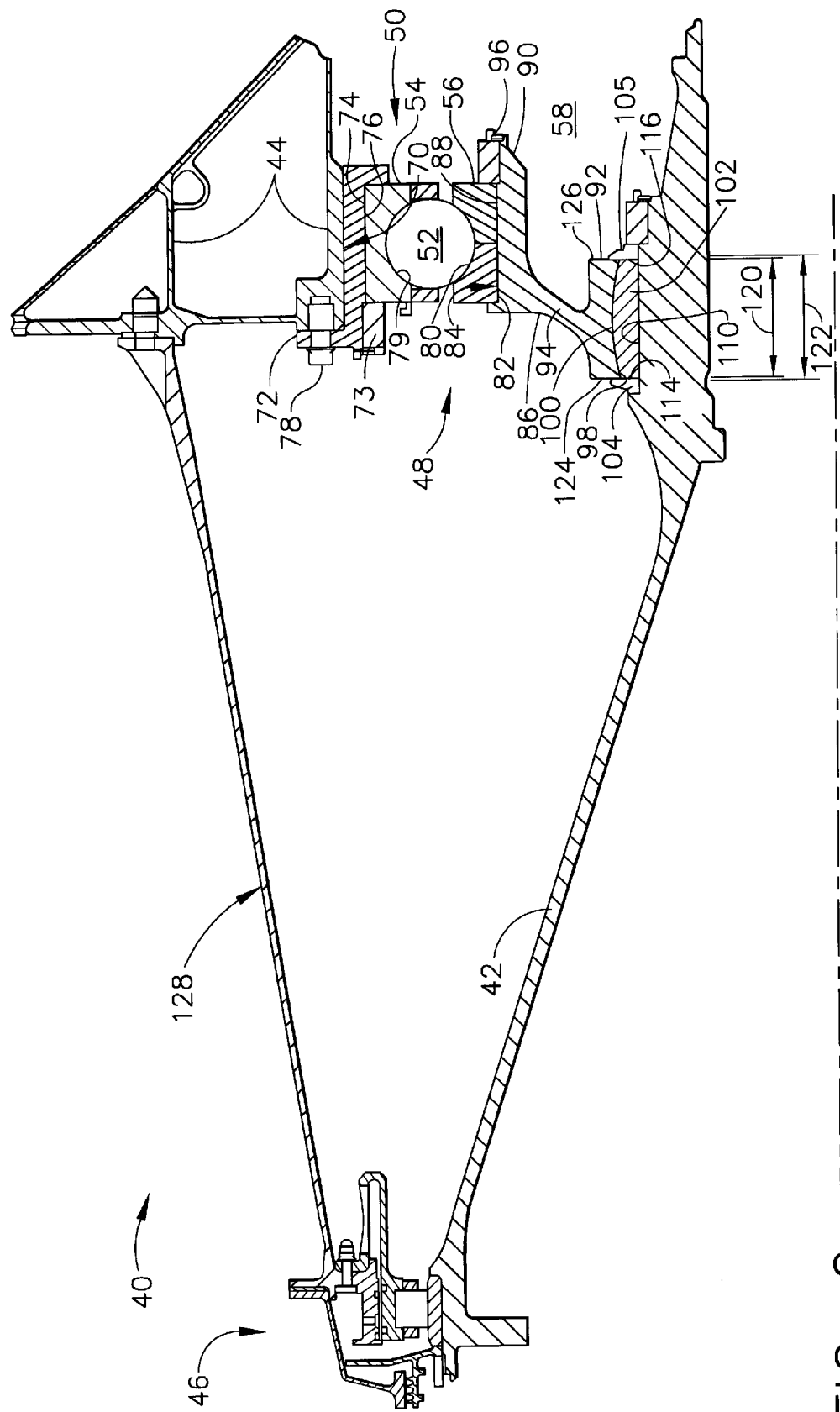
FIG. 2 is a cross-sectional view of a rotor assembly used in the gas turbine engine shown in FIG. 1.

FIG. 2 is a cross-sectional view of a rotor and bearing assembly 40 that may be used with a gas turbine engine, such as engine 10 shown in FIG. 1. In one embodiment, the gas turbine engine is a GE90 available from General Electric Company, Cincinnati, Ohio. Rotor and bearing assembly 40 includes rotor disc 26 (shown in FIG. 1) and a rotor shaft 42 which supports an array of fan blades 24 (shown in FIG. 1)

that extend radially outward from rotor disc 26. Rotor shaft 42 is rotatably secured to a structural support frame 44 with longitudinally spaced bearing assemblies 46 and 48 that support rotor shaft 42 on support frame 44. In one embodiment, bearing assembly 48 is located in a number two bearing position, aft of number one bearing 46, and is a fan thrust bearing.

In an exemplary embodiment, each bearing assembly 48 includes a paired race 50 and a rolling element 52. Paired race 50 includes an outer race 54 and an inner race 56 radially inward from outer race 54. Rolling element 52 is disposed between inner race 56 and outer race 54. Bearing assembly 48 is enclosed within a sealed annular compartment 58 radially bounded by rotor shaft 42 and support frame 44. Rolling element 52 may be a plurality of elements including, but not limited to, a ball bearing or a roller bearing.

Support frame 44 includes a recess 70 defined within a bearing support 72 and sized to receive outer race 54. Outer race 54 is secured within bearing support 72 with a spanner nut 73 such that an outer surface 74 of outer race 54 is adjacent an inner surface 76 of bearing support 72. In an alternative embodiment, outer race 54 is secured within support frame recess 70 with a spanner nut 73. A fastener 78 secures bearing support 72 and outer race 54 within recess 70. In one embodiment, bearing support 72 is radially flexible. A face 79 of outer race 54 is contoured and sized to receive rolling element 52 in rollable contact.

Inner race 56 includes a face 80 and an inner surface 82. Inner race face 80 is contoured and sized to receive rolling element 52 in rollable contact. Inner race 56 is secured within a recess 84 within a cone shaft 86 such that inner race inner surface 82 is adjacent an outer surface 88 of recess 84. In one embodiment, inner race 56 is split race mating and rolling element 52 is a ball bearing. In another embodiment, outer race 54 is split race mating and rolling element 52 is a ball bearing.

Cone shaft 86 extends radially outward from fan rotor shaft 42 and includes an outer portion 90, an inner portion 92, and a body 94 extending therebetween. Recess 84 extends within cone shaft outer portion 90 and is sized to receive inner race 56. A bearing spanner nut 96 secures inner race 56 within cone shaft recess 84. Body 94 provides axial thrust and radial support to bearing assembly 48. Cone shaft inner portion 92 includes an inner surface 98. Inner surface 98 is contoured to fit in slidable contact against a face 100 of a mounting race 102.

Mounting race 102 reduces static loads to rotor assembly 40 and dynamic loads to support frame 44. Mounting race 102 is secured to fan rotor shaft 42 with a pair of retainers 104 and 105. In one embodiment, retainers 104 and 105 are spring clamps and can provide axial preload to shaft inner portion 92. Accordingly, mounting race 102 rotates simultaneously with rotor shaft 42. Fan rotor shaft 42 includes a recess 110 sized to receive mounting race 102 and retainers 104 and 105 such that a gap (not shown) exists between an inner face 114 of retainer 104 and an inner face 116 of retainer 105. Mounting race face 100 is a spherical surface. In one embodiment, mounting race face 100 is radially thin and is ovalized elastically to assemble to mounting race 102.

Mounting race 102 includes a width 120 that is substantially equal to a width 122 of cone shaft inner portion 92 such that when assembled, an upstream side 124 of cone shaft inner portion 92 is substantially co-planar with retainer inner face 114, and a downstream side 126 of cone shaft inner portion 92 is substantially coplanar with retainer inner face 116. An axial preload exits to limit rotation of cone shaft inner portion 92 with respect to mounting race 102, when cone shaft inner portion 92 is not mounted substantially co-planer with mounting race 102.

During assembly of rotor assembly 40, bearing assembly 48 and mounting race 102 may be pre-assembled on fan rotor shaft 42. Pre-assembling bearing assembly 48 and mounting race 102 to rotor shaft 42 minimizes assembly damage and bearing contamination during main engine assembly. Furthermore, as mounting race 102 is secured to fan rotor shaft 42 with retainers 104 and 105, the gap between respective retainers 104 and 105, and mounting race 102 is eliminated. The gap is sized to permit retainers 104 and 105 to provide a controlled amount of axial preload to mounting race 102. In addition, retainers 104 and 105 maintain mounting race 102 substantially square with relation to shaft 42 during assembly and normal operation.

During operation of engine 10, an unbalance of engine 10 may cause high radial forces to be applied to fan assembly 12 (shown in FIG. 1) and a forward most engine bearing. The high radial forces may cause a primary fuse portion 128 to fail at an engine number one bearing position. The primary fuse failure allows fan assembly 12 to rotate about a new axis of rotation, thus changing a center of gravity of rotor shaft 42 and inducing bending loads on rotor shaft 42 that induce a moment load on bearing assembly 48 at the number two engine bearing position. Retainers 104 and 105 are fabricated from a material that fails at a pre-determined moment load applied to rotor shaft 42. After retainer 104 and 105 fails, mounting race spherical face 100 allows shaft 42 to pitch such that a shaft center of rotation (not shown) approaches that of the new rotor center of gravity.

The pitch rotation occurs once because an unbalance radial load has no relative rotation to shaft 42. Rotor shaft 42 remains in a singular bent position because the unbalance radial load is in a singular location. As a result, mounting race spherical face 100 does not oscillate and bearing assembly faces 79 and 80 remain flush against bearing assembly rolling element 52 while rotor shaft 42 rotates. Accordingly, static bending loads transmitted to rotor assembly 40 are reduced because no moment load is induced through bearing 52 after retainers 104 and 105 fail. Furthermore, because no moment load is carried through surfaces 98 and 100, bearing assembly 48 retains radial and axial load capability.

Because a moment restraint is released, rotor assembly 40 is permitted to approach the rotor center of gravity and dynamic loads induced to support frame 44 are reduced. Furthermore, because spherical mounting face 100 and rolling element 52 keep rotor shaft 42 positioned axially with respect to support frame 44, turbine clashing between rotor assembly 40 and a stator assembly (not shown) is substantially eliminated.

Figure 3:
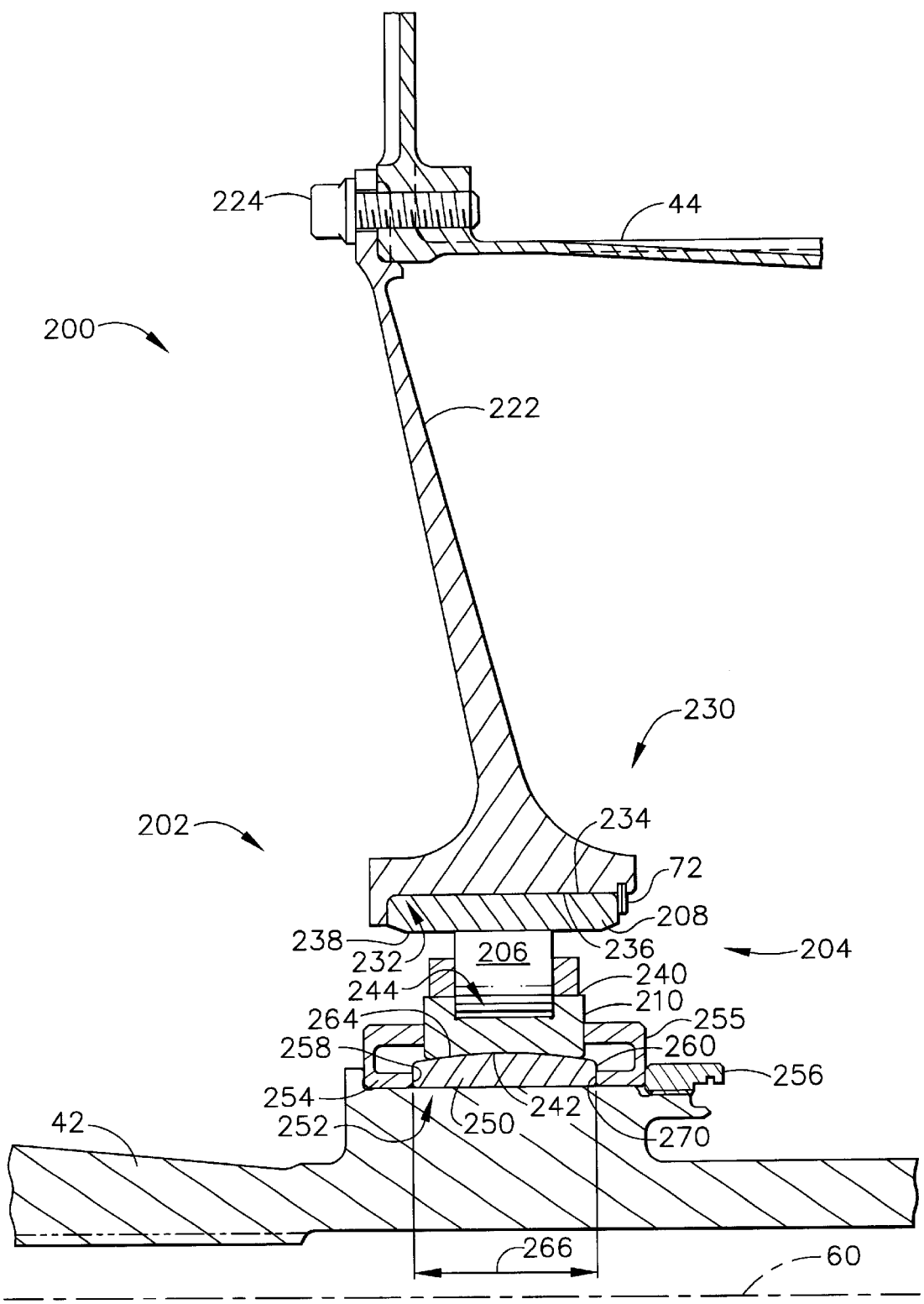
FIG. 3 is a cross-sectional view of an alternative embodiment of the rotor bearing assembly shown in FIG. 2.

FIG. 3 is a cross-sectional view of a rotor assembly 200 that may be used with a gas turbine engine, such as engine 10 shown in FIG. 1. Rotor assembly 200 is substantially similar to rotor assembly 40 shown in FIG. 2 and components in rotor assembly 200 that are identical to components of rotor assembly 40 are identified in FIG. 3 using the same reference numerals used in FIG. 2. Rotor assembly 200 includes rotor shaft 42 rotatably secured to support frame 44 with longitudinally spaced bearing assemblies 46 and 48 (each shown in FIG. 2) that support rotor shaft 42 on support frame 44. In one embodiment, bearing assembly 46 or bearing assembly 48 (shown in FIG. 2) is in a number one bearing position and a bearing assembly 202 is in a number two bearing position, aft of number one bearing position.

Bearing assembly 202 includes a paired race 204 and a rolling element 206. Paired race 204 includes an outer race 208 and an inner race 210 radially inward from outer race 208. Rolling element 206 is disposed between inner race 210 and outer race 208. In one embodiment bearing 206 is a roller bearing.

Support frame 44 is connected to a primary fuse portion 128 (shown in FIG. 2) and a bearing housing 222 with a plurality of fasteners 224. Bearing housing 222 extends radially inward from support frame 44 towards fan rotor shaft 42 and includes an inner portion 230. Inner portion 230 includes a recess 232 to receive bearing assembly outer race 208. Outer race 208 is secured within bearing housing recess 232 with a lockplate 72 such that an outer surface 234 of outer race 208 is adjacent an inside surface 236 of recess 232. In an alternative embodiment, outer race 208 is secured within bearing housing recess 232 with a spanner nut, similar to spanner nut 73 (shown in FIG. 2). An inner face 238 of outer race 208 receives rolling element 206 in rollable contact.

Inner race 210 includes a face 240 and an inner surface 242. Inner race face 240 includes a recess 244 sized to receive rolling element 206 in rollable contact. Mounting race 250 reduces static bending loads to rotor assembly 200 after the primary fuse fails, allowing inner race inner surface 242 to rotate.

Fan rotor shaft 42 includes a recess 252 sized to receive mounting race 250. Mounting race 250 is secured within recess 252 with retainers 254 and 255 that are secured in place with a spanner nut 256 attached to rotor shaft 42. Accordingly, mounting race 250 rotates simultaneously with rotor shaft 42. Retainers 254 and 255 secure mounting race 250 within recess 252 such that a gap (not shown) exists between an inner face 258 of retainer 254 and an inner face 260 of retainer 255. The gap allows retainers 254 and 255 to act as spring clamps. When spanner nut 256 is torqued and seated, a portion of retainer 254 and 255 clamps inner race 210 and the remaining retainer portions clamp mounting race 250 to provide anti-rotation during normal operation. In addition, retainers 254 and 255 maintain inner race 210 substantially square with relation to shaft 42 during assembly and normal operation.

A surface 264 of mounting race 250 is adjacent bearing assembly inner race inner surface 242 and is a spherical surface. In one embodiment, mounting race surface 264 is radially thin and is ovalized elastically to assemble to inner race 210. Inner race inner surface 242 is contoured to fit in slidable contact against mounting race surface 264. Surface 264 extends over a width 266 of mounting race 250 between upstream and downstream sides 258 and 260, respectively, of mounting race 250.

During operation of engine 10, an unbalance of engine 10 may cause high radial forces to be applied to a fan assembly 12 (shown in FIG. 1) and a forward most engine bearing. The high radial forces may cause the primary fuse portion 128 (shown in FIG. 2) to fail at an engine number one bearing position. The failure of primary fuse portion 128 induces a moment load on bearing assembly 202 at the number two engine bearing position. Retainers 254 and 255 are fabricated from a material that plastically fails at a pre-determined moment load applied to bearing assembly 202. After retainers 254 and 255 fail, mounting race spherical face 264 rotates and allows shaft 42 to pitch. Shaft 42 pitches such that a shaft center of rotation approaches that center of gravity of shaft 42. This pitch rotation occurs once because an unbalance radial load has no relative rotation to shaft 42. As a result, mounting race spherical face 242 does not oscillate and bearing assembly faces 238 and 240 remain flush against bearing assembly bearing element 206 while rotor shaft 42 rotates. Accordingly, static bending loads transmitted to rotor assembly 200 are reduced because no moment load is transmitted through bearing 206 after retainer 254 fails and shaft 42 pitches.

The dynamic loads to support frame 44 are also reduced because the shaft center of rotation approaches the shaft center of gravity. The primary fuse is contained in the thrust bearing or the bearing maintaining rotor axial position. When the primary fuse fails, rotor shaft 42 is then free to translate axially since the number two bearing is a roller bearing, and roller bearings do not transmit axial loads. As a result, axial excursions will cause turbine 20 to release rotational energy through friction.

Figure 4:
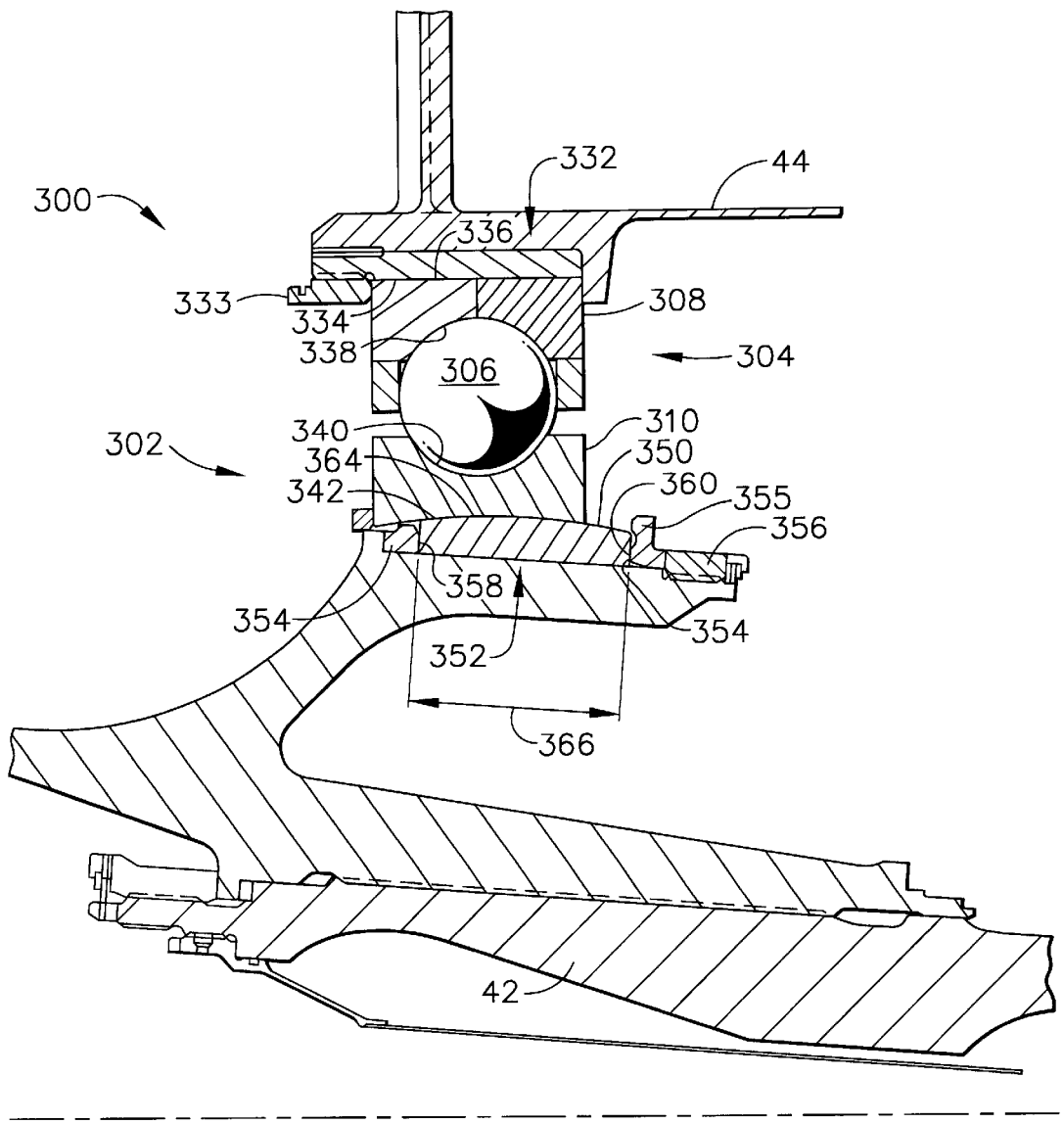
FIG. 4 is a cross-sectional view of another alternative embodiment of the rotor bearing assembly shown in FIG. 2.

FIG. 4 is a cross-sectional view of a rotor assembly 300 that may be used with a gas turbine engine, such as engine 10 shown in FIG. 1. More specifically, FIG. 4 is shown with rotor assembly 300 in a failed position. Rotor assembly 300 is substantially similar to rotor assembly 40 shown in FIG. 2 and components in rotor assembly 300 that are identical to components of rotor assembly 40 are identified in FIG. 4 using the same reference numerals used in FIG. 2. Rotor assembly 300 includes rotor shaft 42 rotatably secured to support frame 44 with longitudinally spaced bearing assemblies 46 and 48 (each shown in FIG. 2) that support rotor shaft 42 on support frame 44. Specifically, a bearing assembly 302 supports shaft 42 in rotor assembly 300. In one embodiment, bearing assembly 46 is a roller bearing and is in a number one bearing position and bearing assembly 302 is a fan thrust bearing and is in a number two bearing position, aft of number one bearing position.

Bearing assembly 302 includes a paired race 304 and a rolling element 306. Paired race 304 includes an outer race 308 and an inner race 310 radially inward from outer race 308. In one embodiment, outer race 308 is split race mating. Rolling element 306 is disposed between inner race 310 and outer race 308. In one embodiment rolling element 306 is a ball bearing.

Support frame 44 includes a recess 332 sized to receive bearing assembly outer race 308. Outer race 308 is secured within bearing housing recess 332 with a spanner nut 333 such that an inner surface 334 of recess 332 is adjacent an outer surface 336 of outer race 308. In an alternative embodiment, outer race 308 is secured within bearing housing recess 332 with a lockplate. A face 338 of outer race 308 is contoured and receives rolling element 306 in rollable contact.

Inner race 310 includes a face 340 and an inner surface 342. Inner race face 340 is contoured to receive rolling element 306 in rollable contact. Inner race 310 is held in slidable contact with a mounting race 350. Mounting race 350 reduces static bending loads to rotor assembly 300 and dynamic loads to support frame 44.

Fan rotor shaft 42 includes a recess 352 sized to receive mounting race 350 and retainers 354 and 355. Mounting race 350 is secured within recess 352 with retainers 354 and 355. Retainers 354 and 355 are held in contact with mounting race 350 with a spanner nut 356 attached to rotor shaft 42. Accordingly, mounting race 350 rotates simultaneously with rotor shaft 42. Retainers 354 and 355 secure mounting race 350 within recess 352 such that a gap (not shown) exists between an inner face 358 of retainer 354 and an inner face 360 of retainer 355.

A face 364 of mounting race 350 is adjacent bearing assembly inner race inner surface 342 and is a spherical surface. In one embodiment, mounting race face 364 is radially thin and is ovalized elastically to assemble to inner race 310. Face 364 extends over a width 366 of mounting race 350 between upstream and downstream sides 358 and 360, respectively, of retainers 354 and 355.

During assembly of rotor assembly 300, as retainers 354 and 355 are tightened to secure inner race 310, the gap between respective retainers 354 and 355, and mounting race 350 is eliminated. The gap is sized to permit retainers 354 and 355 to provide a controlled amount of axial preload to mounting race 350. In addition, retainers 354 and 355 maintain inner race 310 substantially square with relation to shaft 42 during assembly and normal operation.

During operation of engine 10, if a center of gravity of rotor shaft 42 shifts, pitching motion of rotor shaft 42 causes the primary fuse portion to fail at engine number one bearing support. The failure of the primary fuse portion induces a moment load on bearing assembly 302 at the number two engine bearing position. Retainers 354 and 355 are fabricated from material that fails at a pre-determined moment load applied to rotor shaft 42. After retainers 354 and 355 fail, mounting race spherical face 364 allows shaft 42 to pitch such that the shaft center of rotation approaches that of the new rotor shaft center of gravity. The pitch rotation occurs once because an unbalance radial load has no relative rotation to shaft 42. As a result, mounting race spherical face 364 does not oscillate and bearing assembly faces 338 and 340 remain flush against bearing assembly rolling element 306 while rotor shaft 42 rotates. Accordingly, dynamic loads transmitted to rotor assembly 300 are reduced because no moment load is induced through rolling element 306 after retainer 354 fails.

Figure 5:
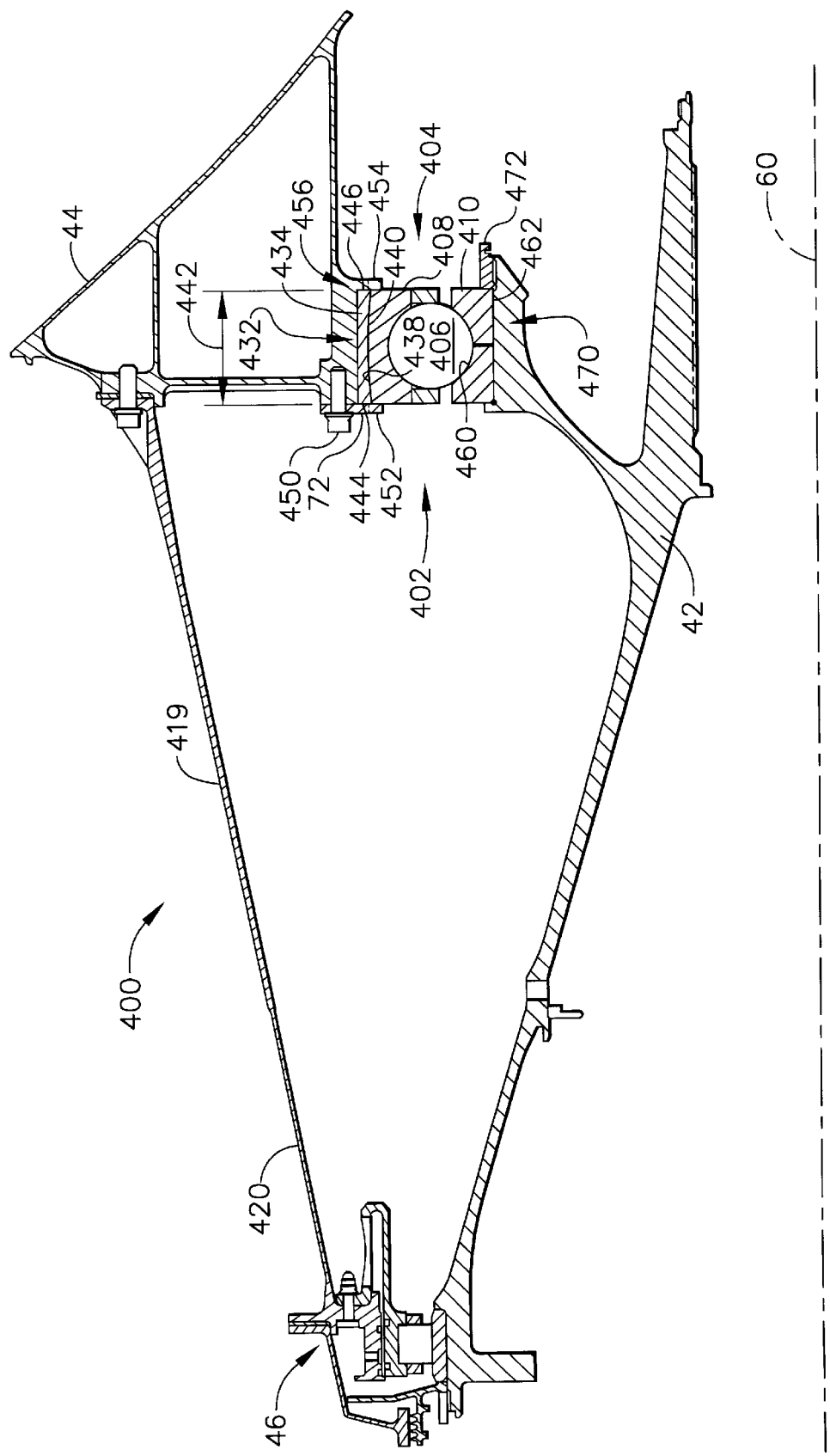
FIG. 5 is a cross-sectional view of a second alternative embodiment of the rotor bearing assembly shown in FIG. 2.

FIG. 5 is a cross-sectional view of a bearing assembly 402 that may be used with rotor assembly 40 (shown in FIG. 2) and a gas turbine engine, such as engine 10 shown in FIG. 1. Bearing assembly 402 supports shaft 42 in rotor assembly 40. In one embodiment, bearing assembly 46 is in a number one bearing position and bearing assembly 402 is a fan thrust bearing and is in a number two bearing position, aft of number one bearing position.

Bearing assembly 402 includes a paired race 404 and a rolling element 406. Paired race 404 includes an outer race 408 and an inner race 410 radially inward from outer race 408. Rolling element 406 is disposed between inner race 410 and outer race 408. In one embodiment rolling element 406 is a ball bearing. In an alternative embodiment, rolling element 406 is a roller bearing and inner race 410 includes a recessed surface (not shown).

Support frame 44 is connected to a housing 419 that includes a primary fuse portion 420 adjacent number one bearing location. Primary fuse portion 420 is fabricated to fail if a center of gravity of rotor shaft 42 is displaced from central axis 60 and the resulting pitching motion of rotor shaft 42 produces a pre-determined load on housing 419.

Support frame 44 includes a recess 432 sized to receive bearing assembly outer race 408 and a mounting race 434. Mounting race 434 reduces dynamic loads to support frame 44 and static bending loads to rotor shaft 42. Outer race 408 is secured within bearing housing recess 432 with a lockplate 72 such that an outer surface 438 of outer race 408 is adjacent a face 440 of mounting race 434. In one embodiment, lockplate 72 is flexible. In another embodiment, lockplate 72 includes frangible tabs. Outer surface 438 of outer race 408 is contoured to conform to a contour of mounting race face 440.

Mounting race face 440 is contoured to receive rolling element 406 in slidable contact and is a spherical surface. In one embodiment, mounting race face 440 is radially thin and is ovalized elastically to assemble to outer race 408. Face 440 extends over a width 442 of mounting race 434 between upstream and downstream sides 444 and 446, respectively of mounting race 434. Mounting race 434 is secured within recess 432 with lockplate 72. Accordingly, mounting race 434 is stationary along with outer race 408 and support frame 44.

A fastener 450 extends through lockplate 72 and secures outer race 408 and mounting race 434 within recess 432. Lockplate 72 includes a retainer tab 452 fabricated to fail if a center of gravity of rotor shaft 42 is displaced from central axis 60 and the resulting pitching motion of rotor shaft 42 exceeds a pre-determined moment load. In one embodiment, lockplate 72 includes a secondary shoulder (not shown) extending forward from lockplate 72 and permitting outer race 408 to rotate more freely relative to support frame 44, while still providing an exceedance stop.

A second retainer tab 454 is substantially similar to retainer tab 452 and extends from support frame 44 adjacent a downstream side 456 of recess 432. In an alternative embodiment, retainer tab 454 is within support frame recess 432 between recess downstream side 456 and outer race downstream side 446.

Inner race 410 includes a face 460 and an inner surface 462. Inner race face 460 is contoured to receive rolling element 406 in rollable contact and inner race 410 is held in rollable contact against rolling element 406 with fan shaft rotor 42. Fan rotor shaft 42 includes a recess 470 sized to receive inner race 410. Inner race 410 is secured within recess 470 with a spanner nut 472. In one embodiment, inner race 410 is split race mating.

During operation of engine 10, if a center of gravity of rotor shaft 42 is displaced from central axis 60, pitching motion of rotor shaft 42 causes primary fuse portion 420 to fail at engine number one bearing position. The failure of primary fuse portion 420 induces a moment load on bearing assembly 402 at the number two engine bearing position. Retainer tabs 452 and 454 are fabricated from a material that plastically fails at a pre-determined moment load applied to bearing assembly 402. After retainers 452 and 454 fail, mounting race spherical face 440 oscillates as shaft 42 pitches and a radial load rotates with respect to spherical surface 440. The increase in shaft pitching facilitates reduces shaft bending stresses and the dynamic stresses transmitted to support structure 44.

The oscillation frequency at the spherical interface and the radial unbalance cycle at rotor speed causes heat generation that increases an interface pressure across mounting race spherical face 440. When the interface pressure reaches a pre-determined value and is greater than an applied moment load, spherical faces 438 and 440 interlock together. The interlock will occur after rotor shaft 42 has decelerated to a lower speed. After faces 438 and 440 have interlocked, the only moment restraint within bearing spherical faces 438 and 440 is as a result of friction that is a function of the coefficient of friction, interference fit pressure, and radial load. The moment load to overcome this friction is reduced when faces 440 have interlocked, such that rolling element 406 and shaft 42 are not overstressed. Accordingly, dynamic loads transmitted to support structure 44 are reduced because the shaft center of rotation approaches the new rotor shaft center of gravity.

Furthermore, if the number two bearing is a ball bearing, then the rotor is held axially after both primary and secondary fuse failure. If the number two bearing is a roller bearing, then the rotor is not held axially after fuse failure and the turbine will release energy through friction.

The above-described rotor assembly is cost-effective and highly reliable. The rotor assembly includes a bearing assembly that includes a paired race and a mounting race. The mounting race is within the rotor assembly with a retainer that plastically fails when a pre-determined moment load is applied to the bearing assembly. During operation, when the retainer fails, static bending loads transmitted to the rotor assembly are reduced because no moment load is transmitted through the bearing assembly after the retainer fails. As a result, the rotor assembly does not transmit potentially damaging dynamic loads to the structural frame supporting the rotor shaft because the center of rotation approaches the rotor shaft center of gravity. Furthermore, because the bearing supporting the unbalanced rotor assembly is maintained, the rotor assembly maintains rotational frequency above a fan windmilling frequency.

While the invention has been described in terms of various specific embodiments, those skilled in the art will recognize that the invention can be practiced with modification within the spirit and scope of the claims.

What is claimed is:

1. A method for reducing dynamic loading of a gas turbine engine, the engine including a rotor shaft assembly including a rotor shaft, a bearing assembly, a mounting race, and a support frame, the bearing assembly including an inner race, an outer race, and a rolling element, the mounting race including a spherical surface, said method comprising the steps of:
   supporting the rotor shaft on the gas turbine engine support frame with the bearing assembly;
   coupling the mounting race to the bearing assembly such that a cone shaft extends between the bearing assembly and the mounting race; and
   operating the gas turbine engine.

2. A method in accordance with claim 1 wherein said step of coupling the mounting race to the bearing assembly further comprises the steps of:
   mounting the mounting race to the rotor shaft such that the mounting race is between the bearing assembly and the rotor shaft; and
   securing the position of the mounting race to the rotor shaft with a retainer that fails at a predetermined moment load.

3. A method in accordance with claim 1 wherein said step of coupling the mounting race to the bearing assembly further comprises the steps of:
   mounting the mounting race to the support frame such that the bearing assembly is between the mounting race and the rotor shaft; and
   securing the position of the mounting race to the support frame with a retainer that fails at a predetermined moment load.

4. A bearing assembly in accordance with claim 1 wherein said step of supporting the rotor shaft further comprises the step of supporting the rotor shaft on the gas turbine engine support frame with a thrust bearing assembly that includes an outer split race mating located radially outward from the inner race.

5. A rotor assembly for a gas turbine engine, said bearing assembly comprising:
   a paired race comprising an outer race and an inner race;
   a bearing between said inner and outer races, said bearing configured to couple to a shaft cone to support the rotor on a support frame;
   a mounting race comprising an upstream side, a downstream side, and a spherical surface extending therebetween, said race configured to reduce dynamic loads to the gas turbine engine structure and static bending to the rotor; and
   a retainer coupled to at least one of said mounting race upstream and downstream said retainer inducing an axial pre-load to said mounting race.

6. A rotor assembly in accordance with claim 5 wherein said retainer configured to maintain said mounting race within said bearing assembly.

7. A rotor assembly in accordance with claim 6 wherein said retainer further configured to maintain position of said mounting race to the rotor during normal operation.

8. A rotor assembly in accordance with claim 6 wherein said mounting race between said inner race and the gas turbine engine rotor.

9. A rotor assembly in accordance with claim 6 wherein at least one of said inner race and said outer race between said mounting race and said support frame.

10. A rotor assembly in accordance with claim 6 wherein said retainer configured to fail at a predetermined moment load.

11. A rotor assembly in accordance with claim 6 wherein said inner race comprises a split race mating.

12. A rotor assembly in accordance with claim 6 wherein said outer race comprises a split race mating.

13. A rotor assembly comprising:
   a rotor shaft;
   a shaft cone;
   a support frame; and
   a bearing assembly coupled to said shaft cone and supporting said rotor shaft to said support frame and configured to reduce dynamic loads to said support frame, said bearing assembly comprising a paired race, a rolling element, a retainer, and a mounting race, said paired race comprising an outer race and an inner race, said rolling element is positioned between said outer and inner races, said mounting race comprising an upstream side, a downstream side, and a spherical surface extending therebetween, said retainer configured to couple to at least one of said mounting race upstream side and said downstream side for inducing a pre-determined axial pre-load to at least one of said bearing assembly and said mounting race.

14. A rotor assembly in accordance with claim 13 wherein said bearing assembly retainer configured to maintain said mounting race within said bearing assembly.

15. A rotor assembly in accordance with claim 14 wherein said bearing assembly retainer configured to fail at a predetermined moment load.

16. A rotor assembly in accordance with claim 13 wherein said bearing assembly mounting race is between said bearing assembly inner race and said rotor shaft.

17. A rotor assembly in accordance with claim 13 wherein at least one of said bearing assembly inner race and said bearing assembly outer race is between said bearing assembly mounting race and said rotor shaft.

18. A rotor assembly in accordance with claim 13 wherein said bearing assembly and said rotor assembly mounting race are between said bearing assembly outer race and said support frame.

19. A rotor assembly in accordance with claim 13 wherein said bearing assembly configured to maintain rotor assembly frequency above a windmill frequency.

* * * * *